UNITED STATES PATENT OFFICE.

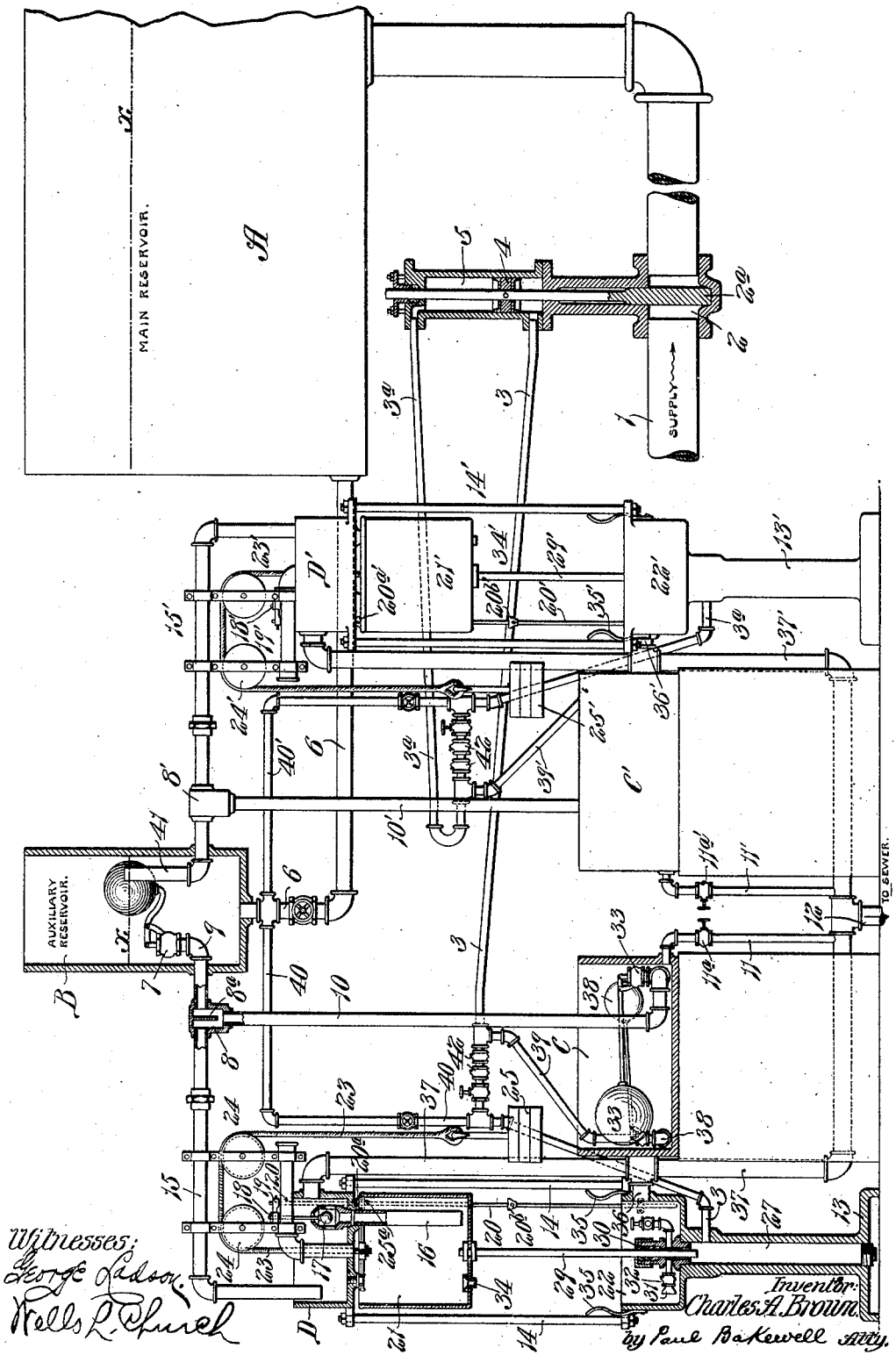

CHARLES ARTHUR BROWN, OF LORAIN, OHIO.

LEVEL-CONTROLLING DEVICE.

976,432.   Specification of Letters Patent.   Patented Nov. 22, 1910.

Application filed April 12, 1909.  Serial No. 489,313.

*To all whom it may concern:*

Be it known that I, CHARLES ARTHUR BROWN, a citizen of the United States, residing at Lorain, Ohio, have invented a certain new and useful Improvement in Level-Controlling Devices, of which the following is a full, clear, and exact description, such as will enable others skilled in the art to which it appertains to make and use the same.

This invention relates to level controllers, and particularly to that class which are utilized to control the flow of water or other liquid into a reservoir or container of either open or closed type and thus maintain an approximately constant level of the liquid in said reservoir.

One object of my invention is to provide a device of the character described that will perform its function with the aid of a very small portion of the water contained in the main reservoir or tank.

Another object is to provide a device which will allow a very little variation in the desired level.

Another object is to provide a device which is automatic in its operation.

Another object is to provide a device that comprises a hydraulic plunger which is actuated by the water in the main reservoir or in an auxiliary reservoir connected to the main reservoir, and means controlled by said plunger for varying the quantity of water that is supplied to the main reservoir.

Other objects and advantages of my improved controller will be hereinafter pointed out.

The figure of the drawing is an elevational view, partly in section, of my improved level-controlling device.

Referring to the drawing which illustrates the preferred form of my invention, A designates a main reservoir or container of a water supply system or the like in which it is desired to maintain a certain level indicated by the broken line $x$. A supply pipe 1 leads from a pump or other similar device, not shown, to the main reservoir A, and said pipe is provided with a valve for controlling the flow of water to said main reservoir. In the construction herein shown a hydraulic gate valve 2 is used, which valve is controlled by two pressure lines 3 and $3^a$, hereinafter described, that coöperate with a piston 4 connected to the gate $2^a$ of the valve, said piston being arranged inside of a cylinder 5 with which the pressure lines 3 and $3^a$ communicate. The water that flows through the pressure line 3 moves the piston 4 in one direction to open the gate valve and thus increase the flow of water through the supply pipe 1, and the water that enters the cylinder 5 through the pressure line $3^a$ moves said piston in the opposite direction and thus diminishes the flow of water through said supply pipe. A pipe 6 which is connected to the main reservoir A, leads to a comparatively small auxiliary reservoir B, which auxiliary reservoir is so located with respect to the main reservoir that the level $x$ of the water in the auxiliary reservoir will be the same as the level of the water in the main reservoir.

Means are provided for automatically opening the valve 2 so as to admit more water into the main reservoir whenever the water drops below the level $x$, due either to a decrease in the flow of water through the valve 2, or an excessive consumption or draining off of the water in the main reservoir, means also being provided for automatically moving the valve 2 in the opposite direction to diminish the flow of water through the supply pipe whenever the level of the water in the main reservoir rises above a predetermined level.

Two separate sets of mechanisms are provided for moving the valve 2 in opposite directions but as these mechanisms are of the same construction and operation I will only describe the mechanism that causes the valve 2 to move automatically when the water falls below the desired level, as indicated by the broken line $x$.

A float valve 7 which is located in the auxiliary reservoir B, communicates with a baffle box 8 by means of a pipe 9, and a pipe 10 leads from said baffle box to a tank C arranged in a lower horizontal plane than the auxiliary reservoir, said tank being provided with a discharge pipe 11 which communicates with a waste pipe 12 that leads to a sewer. A standard 13, which is located adjacent the tank C, carries a plurality of vertically disposed rods 14 that form a support for a tank D located above the standard 13 and in vertical alinement therewith. A pipe 15 leads from the baffle box 8 to the tank D, and said tank is provided with an outlet pipe 16 that projects downwardly from the bottom thereof, said pipe 16 having a valve that is operated by mechanism hereinafter described for controlling the flow of water from the tank D.

In the construction herein shown, a ball valve 17 is arranged inside of a casing that is connected to the upper end of the outlet pipe 16, and the stem of said valve is provided at its upper end with a collar 18 that coöperates with an arm 19 rigidly connected to a vertically disposed actuating rod 20, said rod being adapted to be moved automatically in one direction so as to close the pipe 16, and in the opposite direction to open said pipe and thus permit the water in the tank D to escape through said pipe. A bucket 21, which is located under the tank D, reciprocates vertically between said tank and a receptacle 22 carried by the standard 13, said receptacle preferably being formed integral with the standard, as herein shown. Under normal conditions; namely, when the desired level is attained in the main reservoir, the bucket 21 is held in its raised position, as shown in the drawing, by means of a cable 23 which travels over sheaves 24 and has a weight 25 connected to one end thereof, the opposite end of said cable being connected to the upper end of the bucket. The bucket 21 is provided with a lug or projection 25$^a$ shown in dotted lines which coöperates with projections 20$^a$ and 20$^b$ on the actuating rod 20 so as to move said rod and thus open or close the valve 17 which controls the flow of water from the tank D. The standard 13 is provided with a bore 27 that forms a hydraulic chamber whose upper and lower ends are closed, the upper end of said chamber being closed by a stuffing box 30 through which a plunger 29 projects, said plunger being connected to the bottom of the bucket 21. A small suction pipe 31, which is provided with a check valve 32, is located near the upper end of the chamber 27, and the pressure line 3 that coöperates with the cylinder 5 of the gate valve also communicates with the upper end of said chamber.

If the water in the main reservoir A drops below the level indicated by the broken line $x$, the water in the auxiliary reservoir B will seek the same level. This causes the float valve 7 in the auxiliary reservoir to open automatically and thus permit the water in said auxiliary reservoir to escape through the pipe 9 into the baffle box 8. Said baffle box is provided with a depending baffle plate 8$^a$, and when the escaping water strikes said baffle plate it will be deflected downwardly through the pipe 10 into the tank C. This pipe 10 is provided at its lower end with a float valve 33 which is so arranged that the water can escape freely from the pipe 10 into the tank C, said water causing the float of the valve 33 to rise and thus automatically closing said valve. A portion of the water that enters the tank C escapes therefrom through the drain pipe 11, said pipe being provided with a valve 11$^a$ which is so adjusted that a small quantity of water can always escape through said pipe. The quantity of water that escapes from the tank C through the drain pipe 11, however, is always less than the quantity of water that enters the tank C when the float valve 33 is wide open. Consequently, the float valve 33 never moves far enough to completely cut off the flow of water from the pipe 10, said valve 33 and the valve 11$^a$ in the pipe 11 being so designed that the flow of water through the pipe 10 is gradually diminished until the ingress and egress of the water to and from said tank is equal. The water that is held back by the partial closing of the valve 33 is then compelled to flow through the pipe 15 into the tank D. At this time the bucket 21 is in its elevated position with the projection 25$^a$ on said bucket in engagement with the tripping projection 20$^a$ on the actuating rod 20. The valve 17 is open so that the water which is admitted to the tank D can escape through the pipe 16 into the bucket 21, and as soon as a sufficient quantity of water has entered said bucket to overcome or overbalance the weight 25 said bucket will descend and thus force the plunger 29 downwardly into the hydraulic chamber 27. As the plunger 29 enters the hydraulic chamber 27 pressure will be created therein and thus force the water through the pressure line 3 to the under side of the piston 4 so as to move said piston in a direction to partially raise the gate 2$^a$ of the valve 2 and thereby admit more water into the main reservoir A. When the bucket 21 approaches its lowest position the projection 25$^a$ thereon engages the tripping device 20$^b$ on the rod 20 and thus automatically closes the valve 17 so as to cut off the flow of water through the pipe 16, the water in the tank D then escaping through an outlet pipe 37 to the sewer-pipe 12. The bottom of the bucket is provided with an open nipple 34 so that the water in said bucket can drain out into the receptacle 22 carried by the standard 13. As the water drains out of the bucket the weight 25 tends to restore the bucket to its elevated position but said bucket is prevented from moving upwardly until it is almost empty by means of springs 35 which engage the sides of the bucket and exert sufficient pressure on same to overcome the force of the weight 25. When practically all of the water is drained out of the bucket the force of the weight 25 overcomes the gripping pressure of the springs on the bucket and the bucket then moves upwardly. The upward movement of the bucket withdraws the plunger 29 from the hydraulic chamber 27 and thus creates a partial vacuum in said chamber which causes the check valve 32 on the suction line 31 to open and permit the water in the receptacle 22 to flow into the hydraulic chamber 27 and fill same. When the bucket 21 approaches the upper limit of its stroke the tripping projection 25$^a$ thereon engages the tripping device 20$^a$ on the actuating rod 20 and thus automatically opens the valve 17 so as to permit the water in the tank D to again flow into the bucket and fill same, these operations being repeated until the gate 2$^a$ of the valve in the supply pipe 1 has been opened far enough to permit a sufficient quantity of water to enter the main reservoir until the desired level has been attained.

The receptacle 22 that is mounted on the standard 13 has an outlet pipe 36 which taps into the overflow pipe 37 that leads from the tank D so as to carry the surplus water from the receptacle 22 to the sewer. This outlet pipe 36, however, is so located with reference to the suction pipe 31 that said suction pipe is always immersed in water. I prefer to arrange a float valve 38 in the tank C for closing a pipe 39 which communicates with the pressure line 3. When the water in the tank C begins to rise said float valve 38 is closed automatically to prevent any pressure in the pressure line from escaping. When the valve 2 in the supply pipe 1 has opened sufficiently, however, to raise the level of the water in the main reservoir and the auxiliary reservoir the valve 7 will close and the water in the pipe 10 will drain into the tank C and out through the pipe 11 to the sewer, thus permitting the valve 38 to open and allow any pressure that may develop in the line 3 after the desired level is attained, to escape into the tank C. I prefer to provide a priming pipe or line 40 connected directly to the pipe 6 and leading to the pressure line 3 so that water may be carried along the pipe 3 by the pressure therein to operate the hydraulic valve 2.

A mechanism separate and distinct from that previously described is provided for moving the gate 2$^a$ of the hydraulic valve 2 in the opposite direction to cut off the flow of water through the supply pipe but as said mechanism is of the same construction as that which I have described in detail, I have used the same reference characters for designating the corresponding parts with the prime-mark added. Practically the only difference between said mechanism is that the pipe 15′ which conducts the water from the auxiliary reservoir B to the tank D′ is not provided with a controlling valve but merely has a pipe 41 connected thereto, the upper end of said pipe terminating above the normal level of the water in the main reservoir and auxiliary reservoir. Whenever the water rises above the normal level some of the water in the auxiliary reservoir will flow out of same and thus cause the plunger 29′ to be actuated for forcing water through the pressure line 3$^a$ so as to move the piston 4 downwardly and thus diminish the flow of water through the supply pipe 1. Check valves 42 are arranged in the pressure lines 3 and 3$^a$ and suitable hand valves are provided throughout the entire system to regulate the flow of water in the several pipes or lines.

While this apparatus will not maintain a level in a reservoir at exactly one point such conditions are not absolutely necessary. A small variation in the level is permissible, and this apparatus can be so set to maintain a level at a desired point with sufficient accuracy to meet all practical requirements. The device is thoroughly efficient in its work and needs no operative or attendant to look after same after it has been installed so that it is very economical.

While I have herein shown a hydraulic valve for controlling the flow of water through the supply pipe, I do not wish it to be understood that my broad idea is limited to this particular construction for any preferred type of valve can be used without departing from the spirit of my invention.

Having thus described my invention, what I claim as new and desire to secure by Letters Patent is:

1. A level-controller comprising an auxiliary reservoir that is adapted to be connected to a main reservoir, a valve for controlling the flow of liquid to said main reservoir, and a plurality of hydraulic plungers for moving said valve in opposite directions to vary the quantity of liquid that is admitted to the main reservoir, one of said plungers being actuated automatically by the liquid in the auxiliary reservoir when said liquid falls below a certain level, and the other plunger being actuated automatically by the liquid in said reservoir when said liquid rises above a certain level.

2. An apparatus of the character described, comprising a main reservoir, a valve for controlling the flow of liquid to said reservoir, a hydraulic plunger for actuating said valve, an auxiliary reservoir that communicates with said main reservoir, and means for permitting liquid to escape from said auxiliary reservoir and cause said plunger to open said valve farther when the liquid in the main reservoir falls below a certain level.

3. An apparatus of the character described, comprising a main reservoir, a valve for controlling the flow of liquid to said reservoir, a hydraulic plunger for actuating said valve, an auxiliary reservoir that communicates with said main reservoir, and means for permitting liquid to escape from said auxiliary reservoir and cause said plunger to move the valve toward its closed position when the liquid in the main reservoir rises above a certain level.

4. A level-controller comprising an auxiliary reservoir that is adapted to be connected to a main reservoir, a valve for controlling the flow of liquid to said main reservoir, a hydraulic plunger for actuating said valve, means for causing the liquid in said auxiliary reservoir to move said plunger in one direction when the level of the liquid in the main reservoir varies, and independent means for moving said plunger in the opposite direction to set it in position to be operated by the liquid in the auxiliary reservoir.

5. A level-controller comprising an auxiliary reservoir that is adapted to be connected to a main reservoir, a valve for controlling the supply of liquid to said main reservoir, an hydraulic plunger for actuating said valve, a container connected to said plunger, means for causing the liquid in the auxiliary reservoir to escape therefrom and fill said container when the level in the main reservoir varies, the weight of the liquid that is introduced into said container causing said plunger to move in one direction, and means for returning said plunger to its normal position.

6. A level-controller comprising an auxiliary reservoir that is adapted to be connected to a main reservoir, a valve for controlling the flow of liquid to said main reservoir, an hydraulic plunger for actuating said valve to change the position thereof and thus vary the quantity of liquid that is supplied to the main reservoir, a container connected to said plunger, a tank arranged adjacent said container and provided with an outlet that permits the contents thereof to flow into the container, means for permitting the liquid in the auxiliary reservoir to flow into said tank when the level in the main reservoir varies, a valve for controlling the flow of liquid from said tank to said container, means for opening and closing said valve intermittently so that the flow of liquid from said tank will be cut off after the container has been filled, and means for restoring said plunger to its normal position after it has been depressed by the weight of the liquid which was introduced into the container thereon.

7. A level-controller comprising an auxiliary reservoir that is adapted to be connected to a main reservoir, a valve for controlling the flow of liquid to said main reservoir, an hydraulic plunger for actuating said valve, a container connected to said plunger, means for permitting the liquid in the auxiliary reservoir to escape therefrom when the liquid in the main reservoir is not at a certain level, means for causing the liquid that escapes from said auxiliary reservoir to enter the container on said plunger so as to move said plunger in one direction, means for permitting the liquid to escape from said container when the plunger reaches the end of its stroke, and means for moving said plunger in the opposite direction so that the container will receive another charge of liquid.

8. A level-controller comprising an auxiliary reservoir that is adapted to be connected to a main reservoir, a valve for controlling the flow of liquid to said main reservoir, an hydraulic plunger for actuating said valve, means for permitting the liquid in the auxiliary reservoir to escape therefrom when the level of the liquid in the main reservoir changes materially, and means for causing the liquid that escapes from said auxiliary reservoir to impart enough strokes to said plunger to cause it to turn the reservoir controlling valve into such a position that the normal level in said main reservoir is again attained.

9. In a level-controller, an auxiliary reservoir that is adapted to be connected to a main reservoir, a valve for controlling the flow of liquid to said main reservoir, means for permitting the liquid in said auxiliary reservoir to escape when the level in the main reservoir varies, a tank for receiving the liquid that escapes from said auxiliary reservoir, a float valve for controlling the liquid that escapes into said tank, an hydraulic plunger for actuating the controlling valve for the main reservoir, a container connected to said plunger, means for causing some of the liquid that escapes from said auxiliary reservoir to flow into said container and thus cause the plunger to move in one direction, means for automatically cutting off the supply of liquid to said container after it has been filled, and means for returning said plunger to its former position, said means also operating to permit the liquid to again flow into the container.

10. A level-controller comprising an auxiliary reservoir that is adapted to be connected to a main reservoir, a valve for controlling the supply of liquid to said main reservoir, an hydraulic plunger for actuating said valve, a container connected to said plunger for receiving a liquid so as to impose weight upon the plunger and thus move it in one direction, independent means for moving the plunger in the opposite direction, means for permitting the liquid in the auxiliary reservoir to escape therefrom when the level of the liquid in the main reservoir varies, a baffle box through which the liquid that escapes from the auxiliary reservoir passes, a vertically disposed pipe communicating with said baffle box, a tank for receiving the liquid that flows from said pipe, a float valve for controlling the flow of liquid from said pipe, means for permitting the liquid that passes through said baffle box to enter the container on the plunger, and automatically operated means for cutting off the supply of liquid to said container after it has been filled and for permitting the liquid to again flow into the container after it has been emptied and returned to its normal position.

11. A level-controller comprising an auxiliary reservoir that is adapted to be connected to a main reservoir, a valve for controlling the supply of liquid to said main reservoir, an hydraulic plunger for actuating said valve, a container connected to the plunger for receiving a liquid so as to impose weight upon the plunger and thus move it in one direction, independent means for moving the plunger in the opposite direction, means for permitting the liquid in the auxiliary reservoir to escape therefrom when the level of the liquid in the main reservoir varies, a baffle box through which the liquid that escapes from the auxiliary reservoir passes, a vertically disposed pipe communicating with said baffle box, a tank for receiving the liquid that flows from said pipe, a float valve for controlling the flow of liquid from said pipe, means for permitting the liquid that passes through said baffle box to enter the container on the plunger, automatically operated means for cutting off the supply of liquid to said container after it has been filled and for permitting the liquid to again flow into the container after it has been emptied and returned to its normal position, means for introducing liquid into the cylinder in which the plunger operates when the plunger is withdrawn therefrom, and means for preventing the plunger from returning to its normal position until the contents of the container thereon has been discharged.

12. An apparatus of the character described, comprising a main reservoir, a valve for controlling the supply of liquid to said reservoir, an auxiliary reservoir connected to said main reservoir so that the liquid in both reservoirs will seek the same level, a piston for actuating said controlling valve, pipes leading to the opposite ends of the cylinder in which said piston is arranged for introducing a liquid therein to move said piston in opposite directions, an hydraulic plunger coöperating with each of said pipes for forcing a liquid therethrough, means for permitting the liquid in the auxiliary reservoir to escape therefrom and actuate one of said plungers when the liquid in the main reservoir falls below a certain level, means for permitting the liquid in the auxiliary reservoir to escape therefrom and actuate the other plunger when the liquid in the main reservoir rises above a certain level, and means for permitting any pressure that may develop in one of said pipes after the desired level is attained to escape from said pipe.

13. A device of the character described, comprising a main reservoir, an auxiliary reservoir communicating with said main reservoir, a supply pipe leading to the main reservoir, a valve in said supply pipe, hydraulic plungers for varying the position of said valve, means for permitting water to escape from said auxiliary reservoir when the water therein reaches a certain level and thus cause one of said plungers to move the valve in one direction, and independent means for permiting water to escape from said auxiliary reservoir when the water therein reaches a different level and thus cause the other plunger to move the valve in a different direction.

14. In a device of the character described, a main reservoir, an auxiliary reservoir, both adapted to contain a liquid, a supply pipe entering said main reservoir, a pair of reciprocatingly mounted buckets adapted to be moved in one direction by the liquid contained in said auxiliary reservoir, independent means for moving said buckets in the opposite direction, and means whereby said buckets control the supply entering the main reservoir.

15. In a device of the character described, a main reservoir, an auxiliary reservoir adapted to contain a liquid, a supply pipe to the main reservoir, a valve located in said pipe, a pair of reciprocatingly mounted buckets, stationary tanks located above and in alinement with said buckets, pipe lines leading from said auxiliary reservoir and terminating in said tanks, means for permitting the liquid contained in the auxiliary reservoir to escape into said tanks, means for utilizing the liquid contained in said tanks to operate said buckets, and means operable by said buckets for varying the position of the valve in the main reservoir supply pipe.

16. A device of the character described, comprising a main reservoir, a supply pipe entering said reservoir, a valve in said supply pipe comprising a piston, cylinder and gate, a pair of pressure lines entering said valve cylinder, an auxiliary reservoir communicating with said main reservoir, means for permitting water to escape from said auxiliary reservoir when a certain condition exists, and means adapted to be actuated by the weight of the water that escapes from said auxiliary reservoir for creating a pressure in said pressure lines.

17. A device of the character described, comprising a main reservoir, a supply pipe entering said reservoir, a valve in said supply pipe comprising a piston, cylinder and gate, a pressure line entering the lower end of said cylinder, a pressure line entering the upper end of said cylinder, an auxiliary reservoir communicating with said main reservoir, means for permitting water to escape from said auxiliary reservoir when a certain condition exists, and means adapted to be actuated by the weight of the water that escapes from said auxiliary reservoir for creating a pressure in said pressure lines.

18. In a device of the character described, a main reservoir adapted to contain a liquid, a supply pipe leading thereto, a valve arranged in said pipe, pressure lines communicating with said valve, priming lines communicating with said pressure lines, an auxiliary reservoir communicating with said main reservoir, means for permitting water to escape from said auxiliary reservoir when the water therein reaches a certain level, and hydraulic plungers operated by the weight of the water that escapes from said auxiliary reservoir for forcing the contents of said priming lines through said pressure lines.

19. In a device of the character described, a main reservoir, an auxiliary reservoir, both adapted to contain a liquid, receptacles mounted one above the other, a bucket adapted to travel reciprocatingly between said receptacles, means in the upper receptacle for causing the bucket to travel toward the lower receptacle, and means for restoring said bucket to its raised or normal position.

In testimony whereof I hereunto affix my signature in the presence of two witnesses, this seventh day of April 1909.

CHARLES ARTHUR BROWN.

Witnesses:
VINCENT BURROWS,
J. J. H. STORCK.